United States Patent [19]
Hayashi

[11] Patent Number: 6,101,072
[45] Date of Patent: Aug. 8, 2000

[54] YOKE TYPE OR FLUX GUIDE TYPE MAGNETORESISTIVE HEAD IN WHICH THE YOKE OR FLUX GUIDE IS PROVIDED TO THE MAGNETIC RESISTIVE ELEMENT VIA AN INTERPOSED SOFT MAGNETIC LAYER

[75] Inventor: Kazuhiko Hayashi, Tokyo, Japan

[73] Assignee: NEC Corporation, Japan

[21] Appl. No.: 09/027,703

[22] Filed: Feb. 23, 1998

[30] Foreign Application Priority Data

Feb. 28, 1997 [JP] Japan ..................... 9-046443

[51] Int. Cl.$^7$ ....................................... G11B 5/39
[52] U.S. Cl. ............................................. 360/324
[58] Field of Search ............................... 360/113

[56] References Cited

U.S. PATENT DOCUMENTS 5,701,223 12/1997 Fontana, Jr. et al. .................. 360/113
5,751,521 5/1998 Gill ........................................ 360/113
5,909,345 6/1999 Kawawake et al. ................... 360/113

FOREIGN PATENT DOCUMENTS

| 5977618 | 5/1984 | Japan . |
| 626421 | 1/1987 | Japan . |
| 5334629 | 12/1993 | Japan . |

*Primary Examiner*—George J. Letscher
*Attorney, Agent, or Firm*—Hayes, Soloway, Hennessey, Grossman & Hage, P.C.

[57] ABSTRACT

A soft magnetic layer is employed in place of the nonmagnetic insulating layer in a yoke type or flux guide type magnetoresistive head in which the magnetoresistive element is provided with a yoke or flux guide via a nonmagnetic insulating layer which overlaps the magnetoresistive element, in part. Thus, leakage magnetic field can be guided effectively and playback output can be improved.

16 Claims, 18 Drawing Sheets

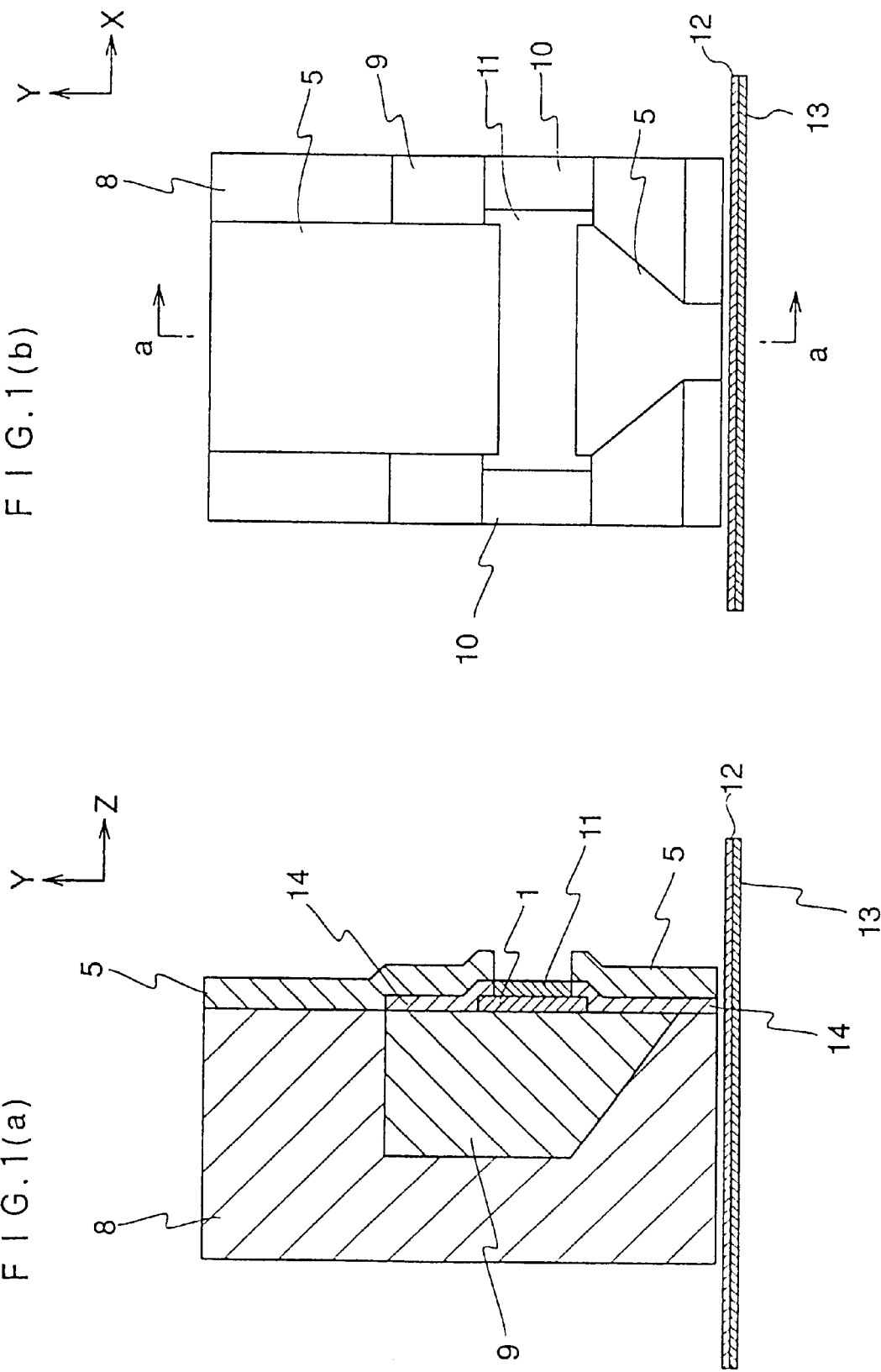

F I G. 2(a)
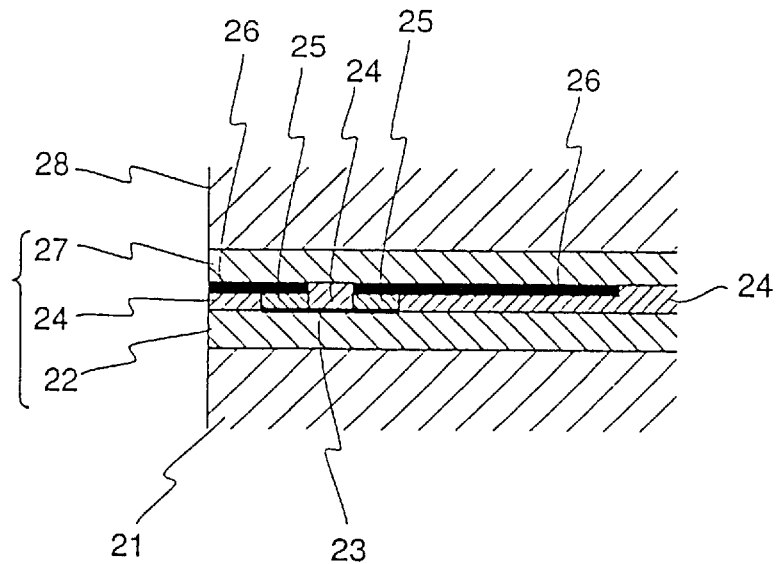
F I G. 2(b)
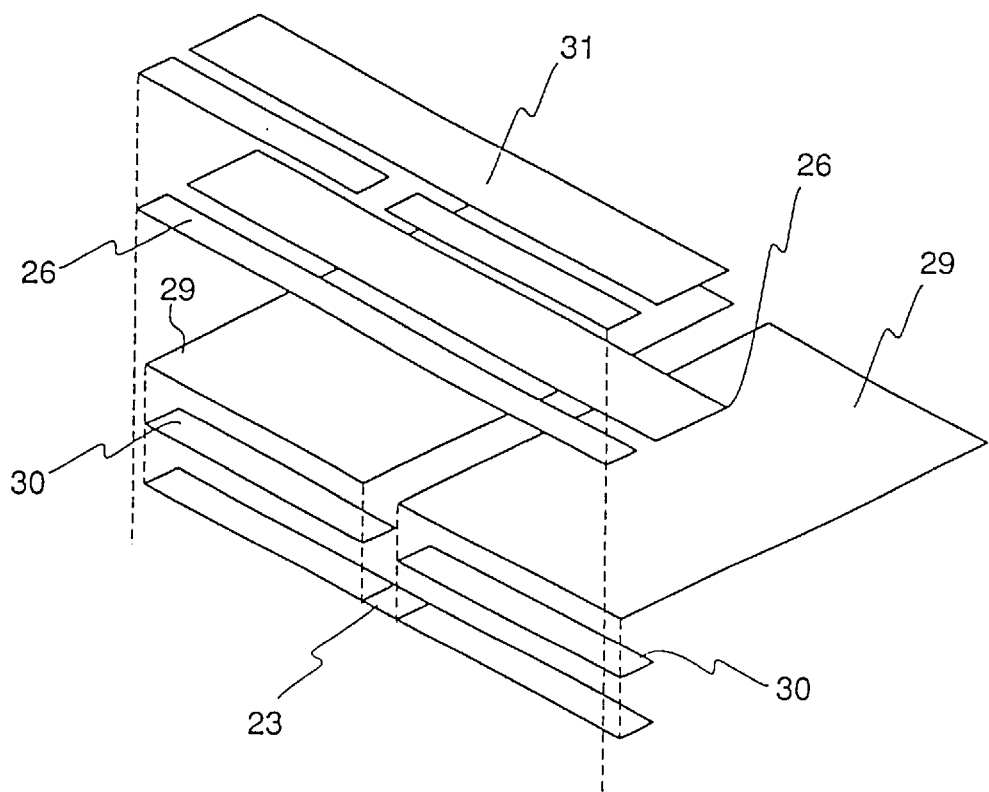

F I G. 3
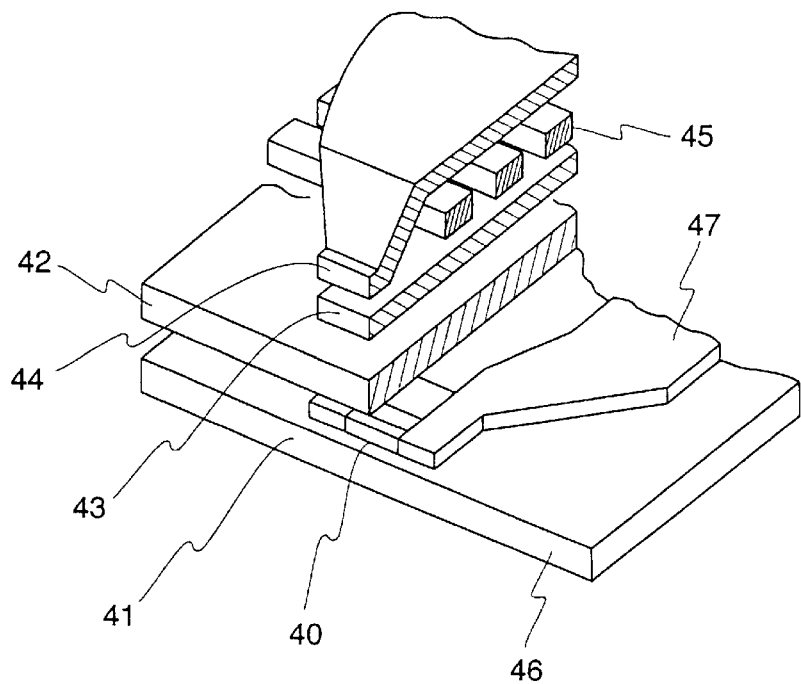
F I G. 4
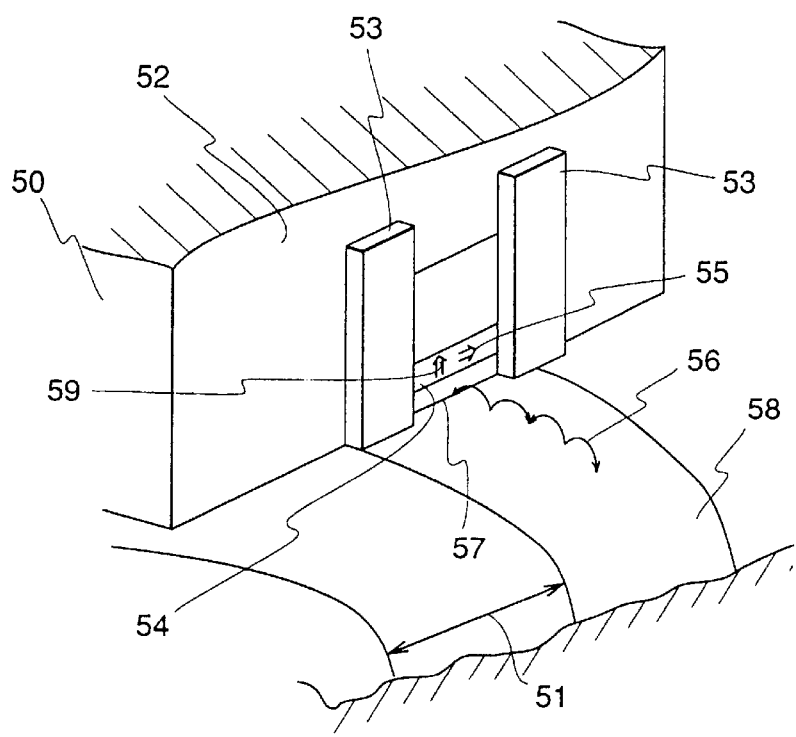

FIG. 7

| MAGNETIC INSULATING LAYER | NiZn FERRITE | MnZn FERRITE | MgZn FERRITE |
|---|---|---|---|
| PLAYBACK OUTPUT HALF-VALUE FREQUENCY (kFCI) | 150 | 153 | 148 |
| PLAYBACK OUTPUT (peak to peak) (mV) | 1.8 | 2.0 | 1.9 |
| NOISE CHARACTERISTICS | GOOD | GOOD | GOOD |
| SYMMETRY | GOOD | GOOD | GOOD |
| S/N (dB) | 24.3 | 24.2 | 24.0 |
| ERROR RATE | $10^{-6}$ OR LESS | $10^{-6}$ OR LESS | $10^{-6}$ OR LESS |

F I G . 8

| MAGNETIC INSULATING LAYER | NiZn FERRITE | MnZn FERRITE | MgZn FERRITE |
|---|---|---|---|
| PLAYBACK OUTPUT HALF-VALUE FREQUENCY (kFCI) | 140 | 144 | 145 |
| PLAYBACK OUTPUT (peak to peak) (mV) | 1.5 | 1.8 | 1.6 |
| NOISE CHARACTERISTICS | GOOD | GOOD | GOOD |
| SYMMETRY | GOOD | GOOD | GOOD |
| S/N (dB) | 24.3 | 24.2 | 24.0 |
| ERROR RATE | $10^{-6}$ OR LESS | $10^{-6}$ OR LESS | $10^{-6}$ OR LESS |

FIG. 9

| MAGNETIC INSULATING LAYER | NiZn FERRITE | MnZn FERRITE | MgZn FERRITE |
|---|---|---|---|
| PLAYBACK OUTPUT HALF-VALUE FREQUENCY (kFCI) | 155 | 158 | 156 |
| PLAYBACK OUTPUT (peak to peak) (mV) | 2.3 | 2.5 | 2.3 |
| NOISE CHARACTERISTICS | GOOD | GOOD | GOOD |
| SYMMETRY | GOOD | GOOD | GOOD |
| S/N (dB) | 25.2 | 25.3 | 25.2 |
| ERROR RATE | $10^{-6}$ OR LESS | $10^{-6}$ OR LESS | $10^{-6}$ OR LESS |

FIG.10

| MAGNETIC INSULATING LAYER | NiZn FERRITE | MnZn FERRITE | MgZn FERRITE |
|---|---|---|---|
| PLAYBACK OUTPUT HALF-VALUE FREQUENCY (kFCI) | 133 | 136 | 133 |
| PLAYBACK OUTPUT (peak to peak) (mV) | 1.6 | 1.6 | 1.5 |
| NOISE CHARACTERISTICS | GOOD | GOOD | GOOD |
| SYMMETRY | GOOD | GOOD | GOOD |
| S/N (dB) | 24.0 | 24.1 | 24.0 |
| ERROR RATE | $10^{-6}$ OR LESS | $10^{-6}$ OR LESS | $10^{-6}$ OR LESS |

FIG.11

| MAGNETIC INSULATING LAYER | NiZn FERRITE | MnZn FERRITE | MgZn FERRITE |
|---|---|---|---|
| PLAYBACK OUTPUT HALF-VALUE FREQUENCY (kFCI) | 132 | 134 | 135 |
| PLAYBACK OUTPUT (peak to peak) (mV) | 1.1 | 1.3 | 1.1 |
| NOISE CHARACTERISTICS | GOOD | GOOD | GOOD |
| SYMMETRY | GOOD | GOOD | GOOD |
| S/N (dB) | 23.8 | 23.9 | 23.8 |
| ERROR RATE | $10^{-5}$ ORDER | $10^{-5}$ | $1 \times 10^{-5}$ ORDER |

F I G. 1 2

| MAGNETIC INSULATING LAYER | NiZn FERRITE | MnZn FERRITE | MgZn FERRITE |
|---|---|---|---|
| PLAYBACK OUTPUT HALF-VALUE FREQUENCY (kFCI) | 145 | 145 | 145 |
| PLAYBACK OUTPUT (peak to peak) (mV) | 1.9 | 1.9 | 1.8 |
| NOISE CHARACTERISTICS | GOOD | GOOD | GOOD |
| SYMMETRY | GOOD | GOOD | GOOD |
| S/N (dB) | 24.3 | 24.5 | 24.4 |
| ERROR RATE | $10^{-6}$ OR LESS | $10^{-6}$ OR LESS | $10^{-6}$ OR LESS |

FIG.13

| FIXED MAGNETIC LAYER | RATE OF CHANGE IN RESISTANCE (%) | RESISTIVITY ($\mu\Omega$ cm) | CHANGE IN RESISITIVITY ($\mu\Omega$ cm) |
|---|---|---|---|
| $Co_{92}Zr_8$ | 6.5 | 50 | 3.2 |
| $Co_{83}Zr_{17}$ | 5.0 | 62 | 3.1 |
| $Co_{92}Hf_8$ | 6.2 | 52 | 3.2 |
| $Co_{83}Ta_{17}$ | 5.3 | 64 | 3.4 |
| $Co_{93}Ta_7$ | 6.4 | 51 | 3.3 |
| $Co_{92}Zr_3Nb_5$ | 6.7 | 63 | 4.2 |
| $Co_{92}Hf_5Pd_3$ | 6.5 | 63 | 4.1 |
| $Co_{88}Ta_8Hf_4$ | 5.8 | 59 | 3.4 |
| $Co_{87}Nb_9Hf_4$ | 5.5 | 57 | 3.1 |
| $Co_{87}Ta_9Zr_4$ | 5.4 | 59 | 3.2 |
| $Co_{86}Nb_9Zr_5$ | 5.8 | 61 | 3.5 |
| $Co_{92}Zr_4Ta_4$ | 6.1 | 58 | 3.8 |
| $Co_{79}Zr_{10}Mo_9Ni_2$ | 5.8 | 66 | 3.4 |
| $Co_{82.5}Zr_{5.5}Ta_4Nb_8$ | 5.5 | 62 | 4.1 |
| $Co_{74}Zr_6Mo_{20}$ | 5.8 | 70 | 3.5 |
| $Co_{72}Fe_8B_{20}$ | 4.9 | 72 | |

FIG.14

| ANTIFERROMAGNETIC LAYER | RATE OF CHANGE IN RESISTANCE (%) | RESISTIVITY (μΩcm) | CHANGE IN RESISTIVITY (μΩcm) |
|---|---|---|---|
| Ni OXIDE (50nm) | 6.7 | 63 | 4.2 |
| FeMn (10nm) | 4.5 | 58 | 2.6 |
| NiMn (30nm) | 4.2 | 46 | 1.9 |
| IrMn (30nm) | 4.5 | 57 | 2.6 |
| PtPdMn (30nm) | 4.5 | 56 | 2.5 |
| Ni OXIDE (50nm) / Co OXIDE (1nm) | 7.0 | 63 | 4.4 |
| Ni OXIDE (50nm) / Fe OXIDE (2nm) | 6.5 | 62 | 4.0 |

F I G. 1 5

| MAGNETIC INSULATING LAYER | NiZn FERRITE | MnZn FERRITE | MgZn FERRITE |
|---|---|---|---|
| PLAYBACK OUTPUT HALF-VALUE FREQUENCY (kFCI) | 150 | 153 | 148 |
| PLAYBACK OUTPUT (peak to peak) (mV) | 2.7 | 2.8 | 2.7 |
| NOISE CHARACTERISTICS | GOOD | GOOD | GOOD |
| SYMMETRY | GOOD | GOOD | GOOD |
| S/N (dB) | 26.3 | 26.1 | 26.5 |
| ERROR RATE | $10^{-6}$ OR LESS | $10^{-6}$ OR LESS | $10^{-6}$ OR LESS |

FIG. 16

| MAGNETIC INSULATING LAYER | NiZn FERRITE | MnZn FERRITE | MgZn FERRITE |
|---|---|---|---|
| PLAYBACK OUTPUT HALF-VALUE FREQUENCY (kFCI) | 144 | 147 | 146 |
| PLAYBACK OUTPUT (peak to peak) (mV) | 2.2 | 2.4 | 2.3 |
| NOISE CHARACTERISTICS | GOOD | GOOD | GOOD |
| SYMMETRY | GOOD | GOOD | GOOD |
| S/N (dB) | 25.4 | 25.7 | 25.6 |
| ERROR RATE | $10^{-6}$ OR LESS | $10^{-6}$ OR LESS | $10^{-6}$ OR LESS |

FIG.17

| MAGNETIC INSULATING LAYER | NiZn FERRITE | MnZn FERRITE | MgZn FERRITE |
|---|---|---|---|
| PLAYBACK OUTPUT HALF-VALUE FREQUENCY (kFCI) | 149 | 151 | 141 |
| PLAYBACK OUTPUT (peak to peak) (mV) | 2.3 | 2.5 | 2.4 |
| NOISE CHARACTERISTICS | GOOD | GOOD | GOOD |
| SYMMETRY | GOOD | GOOD | GOOD |
| S/N (dB) | 25.9 | 26.0 | 26.0 |
| ERROR RATE | $10^{-6}$ OR LESS | $10^{-6}$ OR LESS | $10^{-6}$ OR LESS |

FIG.18

| MAGNETIC INSULATING LAYER | NiZn FERRITE | MnZn FERRITE | MgZn FERRITE |
|---|---|---|---|
| PLAYBACK OUTPUT HALF-VALUE FREQUENCY (kFCl) | 144 | 142 | 143 |
| PLAYBACK OUTPUT (peak to peak) (mV) | 1.9 | 2.2 | 2.0 |
| NOISE CHARACTERISTICS | GOOD | GOOD | GOOD |
| SYMMETRY | GOOD | GOOD | GOOD |
| S/N (dB) | 25.9 | 26.0 | 25.9 |
| ERROR RATE | $10^{-6}$ OR LESS | $10^{-6}$ OR LESS | $10^{-6}$ OR LESS |

FIG.19

| MAGNETIC INSULATING LAYER | NiZn FERRITE | MnZn FERRITE | MgZn FERRITE |
|---|---|---|---|
| PLAYBACK OUTPUT HALF-VALUE FREQUENCY (kFCI) | 146 | 144 | 150 |
| PLAYBACK OUTPUT (peak to peak) (mV) | 1.6 | 1.6 | 1.9 |
| NOISE CHARACTERISTICS | GOOD | GOOD | GOOD |
| SYMMETRY | GOOD | GOOD | GOOD |
| S/N (dB) | 24.8 | 24.9 | 25.4 |
| ERROR RATE | $10^{-6}$ OR LESS | $10^{-6}$ OR LESS | $10^{-6}$ OR LESS |

FIG.20

| MAGNETIC INSULATING LAYER | NiZn FERRITE | MnZn FERRITE | MgZn FERRITE |
|---|---|---|---|
| PLAYBACK OUTPUT HALF-VALUE FREQUENCY (kFCI) | 148 | 149 | 144 |
| PLAYBACK OUTPUT (peak to peak) (mV) | 1.9 | 2.1 | 1.8 |
| NOISE CHARACTERISTICS | GOOD | GOOD | GOOD |
| SYMMETRY | GOOD | GOOD | GOOD |
| S/N (dB) | 25.6 | 25.9 | 25.2 |
| ERROR RATE | $10^{-6}$ OR LESS | $10^{-6}$ OR LESS | $10^{-6}$ OR LESS |

YOKE TYPE OR FLUX GUIDE TYPE MAGNETORESISTIVE HEAD IN WHICH THE YOKE OR FLUX GUIDE IS PROVIDED TO THE MAGNETIC RESISTIVE ELEMENT VIA AN INTERPOSED SOFT MAGNETIC LAYER

BACKGROUND OF THE INVENTION

1. Field of the Invention

The present invention relates to a magnetoresistive head comprising a magnetoresistive element for reading data signals which have been recorded on a magnetic recording medium.

2. Description of the Related Art

In the prior art, converters for magnetic readout, termed magnetoresistance (MR) sensors and magnetoresistive (MR) heads, have been disclosed, and it is known that such devices are capable of readout of data from magnetic surfaces at high linear densities. MR sensors detect magnetic field signals through changes in resistance as a function of the magnetic flux intensity and direction detected by a read element. These MR sensors of the prior art operate on the basis of the anistropic magnetoresistance (AMR) effect, whereby one component of the resistance of the MR element changes in a manner proportional to the square of the cosine of the angle between the magnetization direction and the direction of sense current flow through the element. A more detailed discussion of the AMR effect is provided in the monograph by D A Thompson et al., "Memory, Storage, and Related Applications" IEEE Trans. on Mag. MAG-11, p. 1039 (1975). In magnetic heads which operate on the AMR effect, it is common practice to apply a longitudinal bias in order to suppress Barkhausen noise. In some cases antiferromagnetic materials such as FeMn, NiMn, and nickel oxide are employed as materials for applying longitudinal bias.

A more notable magnetoresistance effect has been reported more recently. Specifically, changes in resistance in stacked magnetic sensors are caused by spin-dependent conduction electron transfer among the magnetic layers through the nonmagnetic layers and concomitant spin-dependent scattering at proximate layer interfaces. This magnetoresistance effect is known by several names, including the "giant magnetoresistance effect" and "spin valve effect". Such magnetoresistance sensors are constructed of suitable materials and offer improved sensitivity and greater changes in resistance than seen with sensors employing the AMR effect. In this type of MR sensor, the planar resistance between a pair of ferroelectric layers separated by a non-magnetic layer changes proportionally to the cosine of the angle between the magnetization direction in the two layers.

Japanese Laid-Open Patent Application 2-61572 discloses a stacked magnetic structure in which large changes in MR are produced by developing antiparallel magnetization within the magnetic layers. The publication cites ferromagnetic transition metals and alloys as materials which can be used in the stacked structure. Also taught is a structure in which an antiferromagnetic layer is attached to one of the at least two ferromagnetic layers separated from the middle layer, and the use of FeMn for the antiferromagnetic layer.

Japanese Laid-Open Patent Application 4-358310 discloses an MR sensor comprising two ferroelectric thin film layers partitioned by a thin film layer of a nonmagnetic metal. The magnetization directions in the two ferroelectric thin film layers are perpendicular when the applied magnetic field is zero, and the resistance between the two unconnected ferroelectric thin film layers changes proportionally to the cosine of the angle between the magnetization direction in the two layers, independent of the direction of current flow through the sensor.

Japanese Laid-Open Patent Application 6-203340 discloses an MR sensor comprising two ferroelectric thin film layers separated by a thin film layer of a nonmagnetic metal material. The effect described above is achieved through the fact that when the externally applied magnetic field is zero, the magnetization in an adjacent antiferroelectric layer is maintained perpendicular to that in the other ferroelectric layers.

Japanese Laid-Open Patent Application 7-262529 discloses a magnetoresistive element which functions as a spin valve comprising a first magnetic layer/nonmagnetic layer/second magnetic layer/antiferroelectric layer structure, and particularly one in which the first and second magnetic layers consist of CoZrNb, CoZrMo, FeSiAl, FeSi, or NiFe, or of these materials with added Cr, Mn, Pt, Ni, Cu, Ag, Al, Ti, Fe, Co, or Zn.

Japanese Laid-Open Patent Application 7-320237 discloses a yoke type magnetoresistive element composed of an artificial lattice magnetoresistive film which comprises two or more stacks, each consisting of two or more types of magnetic thin films exhibiting different coercive force values and stacked with an intervening nonmagnetic layer, and a yoke provided thereto via a nonmagnetic insulating layer. The characterizing feature of this magnetoresistive element is that where HC2 and HC3 (0<HC2 N HC3) represent the coercive force values of adjacent magnetic thin films, and where the y-axis is defined as the magnetization direction under zero magnetic field at saturation magnetization in the magnetic thin film which exhibits coercive force HC3 and the z-axis is defined as the direction running from the aforementioned magnetoresistive film towards the yoke and perpendicular to the film surface of the magnetoresistive film, the flow of current through the magnetoresistive film runs in the negative direction on the x-axis thus defined.

Oyo Jiki Gakkai Shi p. 113–116, Vol. 19, No. 2, (1995) describes an example of a flux guide type playback head which employs an anisotropic magnetoresistive element.

However, the shield type magnetoresistive heads which constitute the majority of types currently in use have problems in terms of potential corrosion and low durability due to exposure of the magnetoresistive element at the head air bearing surface (ABS). On the other hand, with a yoke type or flux guide type magnetoresistive head, which are designed such that the magnetoresistive element is recessed back from the ABS and an external magnetic field is induced to the magnetoresistive film via a soft magnetic yoke or flux guide, the symmetry of the reproduced waveform is greatly improved, the problem of corrosion of the magnetoresistive film is eliminated, and durability is excellent. However, yoke type or flux guide type magnetoresistive heads have the drawback that magnetic flux loss in the yoke or flux guide can result in significantly lower playback output than with shield type artificial lattice magnetoresistive elements.

SUMMARY OF THE INVENTION

It is an object of the present invention to improve the playback output of the magnetoresistive element in a yoke type or flux guide type magnetoresistive head.

In order to achieve the aforementioned object, the present invention employs a magnetic insulating layer or soft magnetic layer in place of the nonmagnetic insulating layer in a yoke type or flux guide type magnetoresistive head in which the magnetoresistive element is provided with a yoke or flux guide via a nonmagnetic insulating layer. Accordingly, leakage magnetic field can be guided efficiently and playback output can be improved. In the past, nonmagnetic materials were used for the nonmagnetic insulating layer, and leakage of magnetic flux tends to occur there, making it impossible to effectively guide leakage magnetic field from the medium to the element.

In magnetoresistive elements stacked in the order substrate layer/antiferromagnetic layer/fixed magnetic layer/nonmagnetic layer/free magnetic layer, simple substances, alloys, or laminate films selected from the group consisting of Co, Ni, and Fe base materials are used for the fixed magnetic layer, while amorphous magnetic materials or alloys such as CoFeB, CoZrMo, CoZrNb, CoZr, CoZrTa, CoHf, CoTa, CoTaHf, CoNbHf, CoZrNb, CoHfPd, CoTaZrNb, and CoZrMoNi are used for the free magnetic layer.

In magnetoresistive elements having a substrate layer/antiferromagnetic layer/fixed magnetic layer/first MR enhancement layer/nonmagnetic layer/second MR enhancement layer/free magnetic layer structure, amorphous magnetic materials or alloys such as CoFeB, CoZrMo, CoZrNb, CoZr, CoZrTa, CoHf, CoTa, CoTaHf, CoNbHf, CoZrNb, CoHfPd, CoTaZrNb, and CoZrMoNi are used for the first and second MR enhancement layers.

In these designs, a fixed magnetic layer is disposed directly on the antiferromagnetic layer, and thus the magnitude of the cross coupling field [1], a particularly important element of the magnetic characteristics of the fixed magnetic layer, is determined by the substrate layer/antiferromagnetic layer/fixed magnetic layer design, and is unaffected by the enhancement layers and free magnetic layer stacked thereon.

Accordingly, if the substrate layer/antiferromagnetic layer/fixed magnetic layer are designed to provide a sufficiently intense cross coupling magnetic field, the fixed magnetic layer is provided with a sufficient cross coupling field for a magnetoresistive element, and the operation of the element will be stable. Furthermore, the aforementioned materials contain Co as the predominant component and therefore afford a high rate of change in magnetoresistance when used for the fixed layer and enhancement layers. Since the aforementioned materials have high resistance, high values for resistance change (the product of resistivity and the rate of change in resistance) can be achieved, and a result, high playback output can be attained.

BRIEF DESCRIPTION OF THE DRAWINGS

FIG. 1 depicts Embodiment 1 of the magnetoresistive head which pertains to the present invention; FIG. 1(a) is a longitudinal sectional view of FIG. 1(b) along line a—a and FIG. 1(b) is a front view;

FIG. 2 depicts Embodiment 2 of the magnetoresistive head which pertains to the present invention; FIG. 2(a) is a sectional view of principal elements and FIG. 2(b) is an exploded perspective view;

FIG. 3 is an exploded perspective view of a magnetoresistive head for recording and playback which pertains to the present invention;

FIG. 4 is a simplified perspective view of a magnetic recording/playback device employing the magnetoresistive head which pertains to the present invention;

FIG. 7 is a chart describing Embodiment 1 of the magnetoresistive head which pertains to the present invention;

FIG. 8 is a chart describing Embodiment 2 of the magnetoresistive head which pertains to the present invention;

FIG. 9 is a chart describing Embodiment 3 of the magnetoresistive head which pertains to the present invention;

FIG. 10 is a chart describing Embodiment 4 of the magnetoresistive head which pertains to the present invention;

FIG. 11 is a chart describing Embodiment 5 of the magnetoresistive head which pertains to the present invention;

FIG. 12 is a chart describing Embodiment 6 of the magnetoresistive head which pertains to the present invention;

FIG. 13 is a chart describing Embodiment 7 of the magnetoresistive head which pertains to the present invention;

FIG. 14 is a chart describing Embodiment 8 of the magnetoresistive head which pertains to the present invention;

FIG. 15 is a chart describing Embodiment 9 of the magnetoresistive head which pertains to the present invention;

FIG. 16 is a chart describing Embodiment 10 of the magnetoresistive head which pertains to the present invention;

FIG. 17 is a chart describing Embodiment 11 of the magnetoresistive head which pertains to the present invention;

FIG. 18 is a chart describing Embodiment 12 of the magnetoresistive head which pertains to the present invention;

FIG. 19 is a chart describing Embodiment 13 of the magnetoresistive head which pertains to the present invention; and FIG. 20 is a chart describing Embodiment 14 of the magnetoresistive head which pertains to the present invention.

DESCRIPTION OF THE PREFERRED EMBODIMENTS

Figure 5:
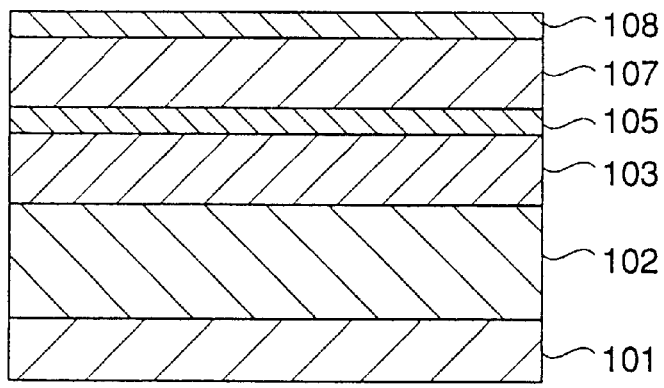
FIG. 5 is a sectional view of Example 1 of the magnetoresistive element employed in the magnetoresistive head which pertains to the present invention.

The scheme of a yoke type magnetoresistive head in which the present invention is implemented is depicted in FIG. 1; the scheme of a flux guide type magnetoresistive head is depicted in FIG. 2.

The type depicted in FIG. 1 comprises a ferromagnetic substrate 8 (such as NiZn ferrite, MnZn ferrite, or MgZn ferrite) in which a groove is formed; the groove is filled with a nonmagnetic insulator 9 (such as alumina, $SiO_2$, aluminum nitride, silicon nitride, or diamond-like carbon). The magnetoresistive element 1 is formed on this nonmagnetic insulator 9; interposing an electrode 10 (such as Au:), a magnetic insulating layer 14 (such as MnZn ferrite, NiZn ferrite, or MgZn ferrite), and a nonmagnetic insulating layer 11 (such as alumina, $SiO^2$, aluminum nitride, silicon nitride, or diamond-like carbon), a yoke 5 (such as NiFe, CoZr, CoFeB, CoZrMo, CoZrNb, CoZr, CoZrTa, CoHf, CoTa, CoTaHf, CoNbHf, CoZrNb, CoHfPd, CoTaZrNb, or CoZrMoNi alloys, FeAlSi, iron nitride materials, MnZn ferrite, NiZn ferrite, or MgZn ferrite) is formed thereon so as to overlap the magnetoresistive element 1. Below the electrode 10 is provided a longitudinal bias layer (such as CoCrPt, CoCr, CoPt, CoCrTa, FeMn, NiMn, Ni oxide, NiCo oxide, IrMn, PtPdMn, or ReMn) for controlling the magnetoresistive element magnetic domain. The longitudinal bias layer is disposed so as to partially overlap or contact the magnetoresistive element.

The type depicted in FIG. 2 comprises a nonmagnetic insulating layer 22 (such as alumina, $SiO_2$, aluminum nitride, silicon nitride, or diamond-like carbon) formed on a bottom shield 21 (such as NiFe , CoZr, CoFeB, CoZrMo, CoZrNb, CoZr, CoZrTa, CoHf, CoTa, CoTaHf, CoNbHf, CoZrNb, CoHfPd, CoTaZrNb, or CoZrMoNi alloys, FeAlSi, iron nitride materials, MnZn ferrite, NiZn ferrite, or MgZn ferrite) and a magnetoresistive element 23 formed on this nonmagnetic insulating layer 22. Additionally stacked thereon are another nonmagnetic insulating layer 24 (such as alumina, $SiO_2$, aluminum nitride, silicon nitride, or diamond-like carbon), a magnetic insulation layer 25, a flux guide 26 (such as NiFe, CoZr, CoFeB, CoZrMo, CoZrNb, CoZr, CoZrTa, CoHf, CoTa, CoTaHf, CoNbHf, CoZrNb, CoHfPd, CoTaZrNb, or CoZrMoNi alloys, FeAlSi, iron nitride materials, MnZn ferrite, NiZn ferrite, or MgZn ferrite), a nonmagnetic insulating layer 27 (such as alumina, $SiO_2$, aluminum nitride, silicon nitride, or diamond-like carbon), and a top shield 28 (such as NiFe, CoZr, CoFeB, CoZrMo, CoZrNb, CoZr, CoZrTa, CoHf, CoTa, CoTaHf, CoNbHf, CoZrNb, CoHfPd, CoTaZrNb, or CoZrMoNi alloys, FeAlSi, iron nitride materials, MnZn ferrite, NiZn ferrite, or MgZn ferrite), in that order. At either side of the magnetoresistive element are provided an electrode 29 and a longitudinal bias layer 30 (such as CoCrPt, CoCr, CoPt, CoCrTa, FeMn, NiMn, Ni oxide, NiCo oxide, IrMn, PtPdMn, or ReMn) for stabilizing the magnetic domain of the magnetoresistive element, disposed so as to partially overlap or contact the magnetoresistive element. A bias layer 31 (such as CoCrPt, CoCr, CoPt, CoCrTa, FeMn, NiMn, Ni oxide, NiCo oxide, IrMn, PtPdMn, or ReMn) is provided above the flux guide) for stabilizing the magnetic domain of the flux guide.

By using these yoke type and flux guide type elements to produce a write head component employing an inductive coil, it is possible to produce an integrated recording/playback head. The following discussion takes the example of a flux guide type, but a yoke type would function analogously.

FIG. 3 is a simplified illustration of a recording/playback head. The recording/playback head comprises a playback head which employs the magnetoresistive element of the present invention, and an inductive type recording head. In this example, the element is mounted on a recording head for lengthwise magnetic recording, but the magnetoresistive element which pertains to the present invention could also be combined with a perpendicular magnetic recording head for use in perpendicular recording.

The head is provided with a playback head comprising on a substrate 46 a bottom shield film 41, a magnetic sensor portion 40, an electrode 47, and a top shield 42, and with a recording head comprising a bottom magnetic film 43, a coil 45, and a top magnetic film 44. The top shield 42 and bottom magnetic film 43 can be shared. With this head, signals can be written to a recording medium, and signals can be read out from a recording medium. The sensor portion of the playback head and the magnetic gap in the recording head are formed in a position overlapping the same slider so that they can be positioned simultaneously over a given track. The head takes the form of a slider which is mounted on the magnetic recording/playback device.

FIG. 4 is a simplified illustration of a magnetic recording/playback device employing the magnetoresistive element which pertains to the present invention. The substrate 52 (which doubles as the head slider 50) is provided thereon with a magnetoresistive element 54 and an electrode film 53; this is positioned over the recording medium 58 for playback. As the recording medium 58 rotates, the head slider 50 floats above the recording medium 58 at a height (float) of 0.2 $\mu$m or less, or is placed in contact with it and undergoes relative motion. By this mechanism, the magnetoresistive element 54 can be positioned so that magnetic signals recorded on the recording medium 58 can be read out through the leakage magnetic field.

Figure 6:
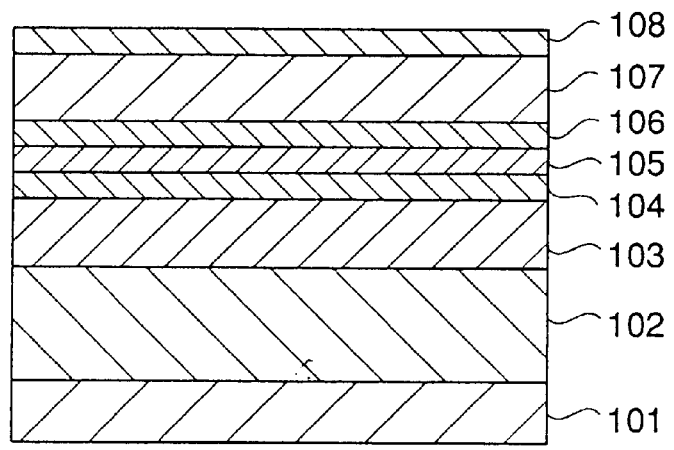
FIG. 6 is a sectional view of Example 2 of the magnetoresistive element employed in the magnetoresistive head which pertains to the present invention.

FIGS. 5 and 6 are simplified illustrations of film structures of the magnetoresistive element employed in the present invention.

The example depicted in FIG. 5 has a structure comprising a substrate layer 101 on which are stacked an antiferromagnetic layer 102, a fixed magnetic layer 103, a nonmagnetic layer 105, a free magnetic layer 107, and a protective layer 108, in that order. The example depicted in FIG. 5 has a structure comprising a substrate layer 101 on which are stacked an antiferromagnetic layer 102, a fixed magnetic layer 103, a first MR enhancement layer 104, a nonmagnetic layer 105, a second MR enhancement layer 106, a free magnetic layer 107, and a protective layer 108, in that order.

The fixed magnetic layer 103 comprises a simple substance, alloy, or laminate film selected from the group of materials consisting of Co, Ni, and Fe as the predominant component. Film thickness is preferably on the order of 1–50 nm.

The first MR enhancement layer 104 consists of Co, Fe, Ni, NiFeCo, FeCo, CoFeB, CoZrMo, CoZrNb, CoZr, CoZrTa, CoHf, CoTa, CoTaHf, CoNbHf, CoZrNb, CoHfPd, CoTaZrNb, CoZrMoNi alloys, or amorphous magnetic materials. Film thickness is preferably on the order of 0.5–5 nm. The MR ratio will be slightly lower when a first MR enhancement layer is not used compared to when it is used, but the number of processes required for fabrication will be reduced to a corresponding degree if the first MR enhancement layer is omitted.

The nonmagnetic layer 105 can consist of Cu, a Cu material containing about 1–20 at % added Ag, a Cu material containing about 1–20 at % added Re, a Cu—Au alloy, or the like. The film thickness should be 2–4 nm.

The second MR enhancement layer 1064 consists of Co, NiFeCo, FeCo, CoFeB, CoZrMo, CoZrNb, CoZr, CoZrTa, CoHf, CoTa, CoTaHf, CoNbHf, CoZrNb, CoHfPd, CoTaZrNb, CoZrMoNi alloys, or amorphous magnetic materials. Film thickness is preferably on the order of 0.5–3 nm. The MR ratio will be slightly lower when a first MR enhancement layer is not used compared to when it is used, but the number of processes required for fabrication will be reduced to a corresponding degree if it is omitted.

The free magnetic layer 107 may consist of single layers, mixtures, or stacked films of NiFe, NiFeCo, CoZrNb, CoZrMo, FeCoB, Sendust, iron oxide base materials, FeCo, and the like. Film thickness is preferably on the order of 1–10 nm. Where the free magnetic layer 107 consists of an NiFe, NiFeCo, or FeCo base material, good crystallinity can be achieved in the free magnetic layer 107 and nonmagnetic layer 105 and the MR ratio can be improved by using Ta, Hf, Zr, W, or the like for the substrate layer 101.

The protective layer 108 can consist of an oxide or nitride [of an element] selected from the group consisting of Al, Si, Ta, and Ti, [an element] selected from the group consisting of Cu, Au, Ag, Ta, Hf, Zr, Ir, Si, Pt, Ti, Cr, Al, and C, or a mixture of the above. The use of the protective layer 108 improves the corrosion resistance, the omission thereof reduces the number of manufacturing steps and improves productivity.

A specific embodiment will now be described. First, the results of test manufacture of yoke type and flux guide type magnetoresistive heads using conventional spin valve type magnetoresistive elements will be presented.

First, a yoke model of the type depicted in FIG. 1 was fabricated using an FeMn base spin valve as the magnetoresistive element. NiZn ferrite was used for the ferromagnetic substrate 8, silicon oxide was used as the nonmagnetic insulator 9 formed in the groove, Ta/Au/Ta was used for the electrode 10, three types of material, NiZn ferrite, MnZn ferrite, and MgZn ferrite, were used for the magnetic insulating layer 14, alumina was used for the nonmagnetic insulating layer 11, a Ta/NiFe laminate film was used for the yoke 5, and $SiO_2$ was used for nonmagnetic insulator 9. The recording medium 12 was a CoCrPt/NiFe two-layer medium; glass was used for the medium substrate. The magnetoresistive element 1 consisted of Ta (5 nm)/NiFe (6 nm)/Cu (2.5 nm)/$Co_{90}Fe_{10}$ (3 nm)/FeMn (10 nm)/Ta (2 nm) processed to dimensions of 2×1 μm using a PR process. CoCrPT and Mo bottom electrode layers were laminated so as to contact the edges thereof.

The head was incorporated into an integrated recording/playback head like that depicted in FIG. 3 and configured as a slider. Data was recorded onto and read out from the medium. The write track width was 1.5 μm and the readout track width was 1.0 μm. The coercive force of the medium was 2.5 kOe (oersted). The properties observed when the playback output was measured while varying the recording mark length are presented in FIG. 7. The heads were subjected to environmental tests at 80° C., 500 Oe; there was no change in the error rate over the first 1500 hours.

Next, a yoke model of the type depicted in FIG. 1 was fabricated using an NiMn base spin valve as the magnetoresistive element. NiZn ferrite was used for the ferromagnetic substrate 8, silicon oxide was used as the nonmagnetic insulator 9 formed in the groove, Ta/Au/Ta was used for the electrode 10, three types of material, NiZn ferrite, MnZn ferrite, and MgZn ferrite, were used for the magnetic insulating layer 14, alumina was used for the nonmagnetic insulating layer 11, a Ta/NiFe laminate film was used for the yoke 5, and $SiO_2$ was used for nonmagnetic insulator 9. The recording medium 12 was a CoCrPt/NiFe two-layer medium; glass was used for the medium substrate. The magnetoresistive element 1 consisted of Ta (5 nm)/NiFe (6 nm)/Cu (2.5 nm)/$Co_{90}Fe_{10}$ (3 nm)/NiMn (30 nm)/Ta (2 nm) processed to dimensions of 2×1 μm using a PR process. CoCrPT and Mo bottom electrode layers were laminated so as to contact the edges thereof.

The head was incorporated into an integrated recording/playback head like that depicted in FIG. 3 and configured as a slider. Data was recorded onto and read out from the medium. The write track width was 1.5 μm and the readout track width was 1.0 μm. The coercive force of the medium was 2.5 kOe. The properties observed when the playback output was measured while varying the recording mark length are presented in FIG. 8. The heads were subjected to environmental tests at 80° C., 500 Oe; there was no change in the error rate over the first 1500 hours.

Next, a yoke model of the type depicted in FIG. 1 was fabricated using an NiO base spin valve as the magnetoresistive element. NiZn ferrite was used for the ferromagnetic substrate 8, silicon oxide was used as the nonmagnetic insulator 9 formed in the groove, Ta/Au/Ta was used for the electrode 10, three types of material, NiZn ferrite, MnZn ferrite, and MgZn ferrite, were used for the magnetic insulating layer 14, alumina was used for the nonmagnetic insulating layer 11, a Ta/NiFe laminate film was used for the yoke 5, and $SiO_2$ was used for nonmagnetic insulator 9. The recording medium 12 was a CoCrPt/NiFe two-layer medium; glass was used for the medium substrate. The magnetoresistive element 1 consisted of NiO (50 nm)/$Co_{90}Fe_{10}$ (3 nm)/Cu (2.5 nm)/NiFe (3 nm)/Ta (2 nm) processed to dimensions of 2×1 μm using a PR process. CoCrPT and Mo bottom electrode layers were laminated so as to contact the edges thereof.

The head was incorporated into an integrated recording/playback head like that depicted in FIG. 3 and configured as a slider. Data was recorded onto and read out from the medium. The write track width was 1.5 μm and the readout track width was 1.0 μm. The coercive force of the medium was 2.5 kOe. The properties observed when the playback output was measured while varying the recording mark length are presented in FIG. 9. The heads were subjected to environmental tests at 80° C., 500 Oe; there was no change in the error rate over the first 1500 hours.

Next, a flux guide type element of the type depicted in FIG. 2 was fabricated using an FeMn base spin valve as the magnetoresistive element. NiZn ferrite was used for the ferromagnetic substrate 8, silicon oxide was used as the nonmagnetic insulator 9 formed in the groove, Ta/Au/Ta was used for the electrode 10, three types of material, NiZn ferrite, MnZn ferrite, and MgZn ferrite, were used for the magnetic insulating layer 14, alumina was used for the nonmagnetic insulating layer 11, a Ta/NiFe laminate film was used for the yoke 5, and $SiO_2$ was used for nonmagnetic insulator 9. The recording medium 12 was a CoCrPt/NiFe two-layer medium; glass was used for the medium substrate. The magnetoresistive element 1 consisted of Ta (5 nm)/NiFe (6 nm)/Cu (2.5 nm)/$Co_{90}Fe_{10}$ (3 nm)/FeMn (10 nm)/Ta (2 nm) processed to dimensions of 2×1 μm using a PR process. CoCrPT and Mo bottom electrode layers were laminated so as to contact the edges thereof.

The head was incorporated into an integrated recording/playback head like that depicted in FIG. 3 and configured as a slider. Data was recorded onto and read out from the medium. The write track width was 1.5 μm and the readout track width was 1.0 μm. The coercive force of the medium was 2.5 kOe. The properties observed when the playback output was measured while varying the recording mark length are presented in FIG. 10. The heads were subjected to environmental tests at 80° C., 500 Oe; there was no change in the error rate over the first 1500 hours.

Next, a flux guide type element of the type depicted in FIG. 2 was fabricated using an NiMn base spin valve as the magnetoresistive element. NiZn ferrite was used for the ferromagnetic substrate 8, silicon oxide was used as the nonmagnetic insulator 9 formed in the groove, Ta/Au/Ta was used for the electrode 10, three types of material, NiZn ferrite, MnZn ferrite, and MgZn ferrite, were used for the magnetic insulating layer 14, alumina was used for the nonmagnetic insulating layer 11, a Ta/NiFe laminate film was used for the yoke 5, and $SiO_2$ was used for nonmagnetic insulator 9. The recording medium 12 was a CoCrPt/NiFe two-layer medium; glass was used for the medium substrate. The magnetoresistive element 1 consisted of Ta (5 nm)/NiFe (6 nm)/Cu (2.5 nm)/$Co_{90}Fe_{10}$ (3 nm)/NiMn (30 nm)/Ta (2 nm) processed to dimensions of 2×1 μm using a PR process.

CoCrPT and Mo bottom electrode layers were laminated so as to contact the edges thereof.

The head was incorporated into an integrated recording/playback head like that depicted in FIG. 3 and configured as a slider. Data was recorded onto and read out from the medium. The write track width was 1.5 μm and the readout track width was 1.0 μm. The coercive force of the medium was 2.5 kOe. The properties observed when the playback output was measured while varying the recording mark length are presented in FIG. 11. The heads were subjected to environmental tests at 80° C., 500 Oe; there was no change in the error rate over the first 1500 hours.

Next, a flux guide type element of the type depicted in FIG. 2 was fabricated using an NiO base spin valve as the magnetoresistive element. NiZn ferrite was used for the ferromagnetic substrate 8, silicon oxide was used as the nonmagnetic insulator 9 formed in the groove, Ta/Au/Ta was used for the electrode 10, three types of material, NiZn ferrite, MnZn ferrite, and MgZn ferrite, were used for the magnetic insulating layer 14, alumina was used for the nonmagnetic insulating layer 11, a Ta/NiFe laminate film was used for the yoke 5, and $SiO_2$ was used for nonmagnetic insulator 9. The recording medium 12 was a CoCrPt/NiFe two-layer medium; glass was used for the medium substrate. The magnetoresistive element 1 consisted of NiO (50 nm)/$CO_{90}Fe_{10}$ (3 nm)/Cu (2.5 nm)/NiFe (3 nm)/Ta (2 nm) processed to dimensions of 2×1 μm using a PR process. CoCrPT and Mo bottom electrode layers were laminated so as to contact the edges thereof.

The head was incorporated into an integrated recording/playback head like that depicted in FIG. 3 and configured as a slider. Data was recorded onto and read out from the medium. The write track width was 1.5 μm and the readout track width was 1.0 μm. The coercive force of the medium was 2.5 kOe. The properties observed when the playback output was measured while varying the recording mark length are presented in FIG. 12. The heads were subjected to environmental tests at 80° C., 500 Oe; there was no change in the error rate over the first 1500 hours.

The magnetoresistive film disclosed in the Claims was test-produced in order to fabricate a magnetoresistive element with the goal of employing it in the magnetoresistive head which pertains to the present invention.

As a conventional example, a magnetoresistive film having the structure: glass substrate/Ni oxide (50 nm)/$Co_{90}Fe_{10}$ (3 nm)/Cu (2.5 nm)/$Co_{90}Fe_{10}$ (1 nm)/$Ni_{80}Fe_{20}$ (5 nm) was fabricated. Film formation was conducted in a 500 Oe applied magnetic field using a magnetron sputtering unit. A magnetic field was applied to the magnetoresistive film in a direction parallel to the magnetic field used in film formation and an M-H curve was plotted. A low rate of change in resistance (7%) was obtained. The resistivity of the element at zero applied magnetic field was 25 μΩcm; the change in resistivity was 1.75 μΩcm.

Next, magnetoresistive films having the structure: glass substrate/Ni oxide (50 nm)/$Co_{90}Fe_{10}$ (3 nm)/Cu (2.5 nm)/fixed magnetic layer (6 nm) were fabricated using various alloys for the fixed magnetic layer. Film formation was conducted in a 500 Oe applied magnetic field using a magnetron sputtering unit. The rate of change in resistance, resistivity, and change in resistivity produced when a magnetic field was applied to the magnetoresistive films in a direction parallel to the magnetic field used in film formation and M-H curves were plotted are given in FIG. 13. In each case, the change in resistivity was greater than when the materials cited in FIG. 13 were not used.

Next, a magnetoresistive film having the structure: glass substrate/Ni oxide (50 nm)/$Co_{90}Fe_{10}$ (1.5 nm)/$Cr_{74}Zr_6Mo_{20}$ (1.5 nm)/Cu (2.5 nm)/$Cr_{74}Zr_6Mo_{20}$ (6 nm) was fabricated. Film formation was conducted in a 500 Oe applied magnetic field using a magnetron sputtering unit. A magnetic field was applied to the magnetoresistive film in a direction parallel to the magnetic field used in film formation and an M-H curve was plotted. A low rate of change in resistance (6.0%) was obtained. The resistivity of the element at zero applied magnetic field was 65 μΩcm; the change in resistivity was 3.9 μΩcm.

Next, a magnetoresistive film having the structure: glass substrate/Ni oxide (50 nm)/$Co_{90}Fe_{10}$ (1.5 nm)/$Cr_{74}Zr_6Mo_{20}$ (1.5 nm)/Cu (2.5 nm)/$Cr_{74}Zr_6Mo_{20}$ (3 nm)/$Ni_{80}Fe_{20}$ was fabricated. Film formation was conducted in a 500 Oe applied magnetic field using a magnetron sputtering unit. A magnetic field was applied to the magnetoresistive film in a direction parallel to the magnetic field used in film formation and an M-H curve was plotted. A low rate of change in resistance (5.0%) was obtained. The resistivity of the element at zero applied magnetic field was 45 μΩcm; the change in resistivity as 2.25 μΩcm.

Next, a magnetoresistive film having the structure: glass substrate/Ni oxide (50 nm)/$Co_{90}Fe_{10}$ (3.0 nm)/Cu (2.5 nm)/$Co_{92}Zr_3Nb_5$ (3 nm)/Ru (0.4 nm)/$Co_{92}Zr_3Nb_5$ (3 nm) was fabricated. Film formation was conducted in a 500 Oe applied magnetic field using a magnetron sputtering unit. A magnetic field was applied to the magnetoresistive film in a direction parallel to the magnetic field used in film formation and an M-H curve was plotted. A low rate of change in resistance (4.8%) was obtained. Films having this structure exhibited good magnetic field sensitivity even when employed in elements patterned to 1μ widths. This is attributed to extremely low effective magnetization of the free magnetic layer due to antiferro[magnetic] coupling between the two $Co_{92}Zr_3Nb_5$ layers via the Ru [layer] in the $Co_{92}Zr_3Nb_5$ (3 nm)/Ru (0.4 nm)/$Co_{92}Zr_3Nb_5$ (3 nm) portion and low magnetostatic coupling between the fixed magnetic layer and the free magnetic layer. The resistivity of the element at zero applied magnetic field was 43 μΩcm; the change in resistivity was 2.1 μΩcm.

Next, a magnetoresistive film having the structure: glass substrate/Ni oxide (50 nm)/$Co_{90}Fe_{10}$ (2 nm)/Ru (0.4 nm)/$Co_{90}Fe_{10}$ (2 nm)/Cu (2.5 nm)/$Co_{92}Zr_3Zb_5$ [2] (3 nm) was fabricated. Film formation was conducted in a 500 Oe applied magnetic field using a magnetron sputtering unit. A magnetic field was applied to the magnetoresistive film in a direction parallel to the magnetic field used in film formation and an M-H curve was plotted. A low rate of change in resistance (4.9%) was obtained. Films having this structure exhibited good magnetic field sensitivity even when employed in elements patterned to 1μ widths. This is attributed to extremely low effective magnetization of the free magnetic layer due to antiferro[magnetic] coupling between the two CoFe layers via the Ru [layer] in the $Co_{90}Fe_{10}$ (2 nm)/Ru (0.4 nm)/$Co_{90}Fe_{10}$ (2 nm) portion and low magnetostatic coupling between the fixed magnetic layer and the free magnetic layer. The resistivity of the element at zero applied magnetic field was 41 μΩcm; the change in resistivity was 2.0 μΩcm.

Next, a magnetoresistive film having the structure: glass substrate/Ni oxide (50 nm)/$Co_{90}Fe_{10}$ (3 nm)/Ru (0.4 nm)/$Co_{90}Fe_{10}$ (3 nm)/Cu (2.5 nm)/$Co_{92}Zr_3Nb_5$ (3 nm) Ru (0.4 nm)/$Co_{92}Zr_3Nb_5$ (3 nm) was fabricated. Film formation was conducted in a 500 Oe applied magnetic field using a magnetron sputtering unit. A magnetic field was applied to the magnetoresistive film in a direction parallel to the magnetic field used in film formation and an M-H curve was plotted. A low rate of change in resistance (4.5%) was obtained. Films having this structure exhibited good magnetic field sensitivity even when employed in elements patterned to 1µ widths. This is attributed to extremely low effective magnetization of the free magnetic layer due to antiferro[magnetic] coupling via the Ru [layer] between the two CoFe layers in the $Co_{90}Fe_{10}$ (2 nm) /Ru (0.4 nm) /$Co_{90}Fe_{10}$ (2 nm) portion and the two $Co_{92}Zr_3Nb_5$ layers in the $Co_{92}Zr_3Nb_5$ (3 nm)/Ru (0.4 nm)/$Co_{92}Zr_3Nb_5$ (3 nm) portion and low magnetostatic coupling between the fixed magnetic layer and the free magnetic layer. The resistivity of the element at zero applied magnetic field was 38 µΩcm; the change in resistivity was 1.7 µΩcm.

First, magnetoresistive films having the structure: antiferromagnetic layer/$Co_{90}Fe_{10}$ (3 nm)/Cu (2.5 nm)/$Co_{92}Zr_3Nb_5$ (6 nm) were fabricated using various alloys for the substrate layer/antiferromagnetic layer. Film formation was conducted in a 500 Oe applied magnetic field using a magnetron sputtering unit. The rate of change in resistance, resistivity, and change in resistivity produced when a magnetic field was applied to the magnetoresistive films in a direction parallel to the magnetic field used in film formation and M-H curves were plotted are given in FIG. 14.

Finally, examples of implementation of the magnetoresistive films described above in the yoke type and flux guide type elements disclosed in the Claims will be presented. First, a yoke model of the type depicted in FIG. 1 was fabricated using an Ni oxide/Fe oxide two-layer film for the antiferromagnetic layer and $Co_{92}Zr_3Nb_5$ for the free magnetic layer.

NiZn ferrite was used for the ferromagnetic substrate 8, silicon oxide was used as the nonmagnetic insulator 9 formed in the groove, Ta/Au/Ta was used for the electrode 10, three types of material, NiZn ferrite, MnZn ferrite, and MgZn ferrite, were used for the magnetic insulating layer 14, alumina was used for the nonmagnetic insulating layer 11, a Ta/NiFe laminate film was used for the yoke 5, and $SiO_2$ was used for nonmagnetic insulator 9. The recording medium 12 was a CoCrPt/NiFe two-layer medium; glass was used for the medium substrate. The magnetoresistive element 1 consisted of Ni oxide (50 nm)/Fe oxide (2 nm)/$Co_{90}Fe_{10}$ (3 nm)/Cu (2.5 nm)/$Co_{92}Zr_3Nb_5$ (6 nm) processed to dimensions of 2×1 µm using a PR process. CoCrPT and Mo bottom electrode layers were laminated so as to contact the edges thereof.

The head was incorporated into an integrated recording/playback head like that depicted in FIG. 3 and configured as a slider. Data was recorded onto and read out from the medium. The write track width was 1.5 µm and the readout track width was 1.0 µm. The coercive force of the medium was 2.5 kOe. The properties observed when the playback output was measured while varying the recording mark length are presented in FIG. 15. The heads were subjected to environmental tests at 80° C., 500 Oe; there was no change in the error rate over the first 1500 hours.

Next, a yoke type element of the type depicted in FIG. 1 was fabricated using NiMn for the antiferromagnetic layer and $Co_{92}Zr_8$ for the free magnetic layer. NiZn ferrite was used for the ferromagnetic substrate 8, silicon oxide was used as the nonmagnetic insulator 9 formed in the groove, Ta/Au/Ta was used for the electrode 10, three types of material, NiZn ferrite, MnZn ferrite, and MgZn ferrite, were used for the magnetic insulating layer 14, alumina was used for the nonmagnetic insulating layer 11, a Ta/NiFe laminate film was used for the yoke 5, and $SiO_2$ was used for nonmagnetic insulator 9. The recording medium 12 was a CoCrPt/NiFe two-layer medium; glass was used for the medium substrate. The magnetoresistive element 1 consisted of Ta (5 nm)/$Co_{92}Zr_8$ (6 nm)/Cu (2.5 nm)/$Co_{90}Fe_{10}$ (3 nm)/NiMn (30 nm) processed to dimensions of 2×1 µm using a PR process. CoCrPT and Mo bottom electrode layers were laminated so as to contact the edges thereof.

The head was incorporated into an integrated recording/playback head like that depicted in FIG. 3 and configured as a slider. Data was recorded onto and read out from the medium. The write track width was 1.5 µm and the readout track width was 1.0 µm. The coercive force of the medium was 2.5 kOe. The properties observed when the playback output was measured while varying the recording mark length are presented in FIG. 16. The heads were subjected to environmental tests at 80° C., 500 Oe; there was no change in the error rate over the first 1500 hours.

Next, a yoke type element of the type depicted in FIG. 1 was fabricated using FeMn for the antiferromagnetic layer and $CO_{72}Fe_8B_{20}$ for the free magnetic layer. NiZn ferrite was used for the ferromagnetic substrate 8, silicon oxide was used as the nonmagnetic insulator 9 formed in the groove, Ta/Au/Ta was used for the electrode 10, three types of material, NiZn ferrite, MnZn ferrite, and MgZn ferrite, were used for the magnetic insulating layer 14, alumina was used for the nonmagnetic insulating layer 11, a Ta/NiFe laminate film was used for the yoke 5, and $SO_2$ was used for nonmagnetic insulator 9. The recording medium 12 was a CoCrPt/NiFe two-layer medium; glass was used for the medium substrate. The magnetoresistive element 1 consisted of Ta (5 nm)/$CO_{72}Fe_8B_{20}$ (6 nm)/Cu (2.5 nm)/$Co_{90}Fe_{10}$ (3 nm)/FeMn (10 nm) processed to dimensions of 2×1 µm using a PR process. CoCrPT and Mo bottom electrode layers were laminated so as to contact the edges thereof.

The head was incorporated into an integrated recording/playback head like that depicted in FIG. 3 and configured as a slider. Data was recorded onto and read out from the medium. The write track width was 1.5 µm and the readout track width was 1.0 µm. The coercive force of the medium was 2.5 kOe. The properties observed when the playback output was measured while varying the recording mark length are presented in FIG. 17. The heads were subjected to environmental tests at 80° C., 500 Oe; there was no change in the error rate over the first 1500 hours.

Next, a flux guide type element of the type depicted in FIG. 2 was fabricated using NiO for the antiferromagnetic layer and $Co_{92}Hf_5Pd_3$ for the free magnetic layer. NiFe was used for the bottom shield 21, alumina was used for the nonmagnetic insulating layers 22 and 24, three types of material, NiZn ferrite, MnZn ferrite, and MgZn ferrite, were used for the magnetic insulating layer 25, NiFe was used for the flux guide 26, alumina was used for the nonmagnetic insulating layer 27, CoZrTa was used for the top shield 28, Ta/Au/Ta was used for the electrode 29, CoCrPt was used for the bias layer 30 for stabilizing the magnetic domain of the magnetoresistive element, and NiMn was used for the bias layer 31 for stabilizing the magnetic domain of the flux guide. The recording medium was a CoCrPt/NiFe two-layer medium; glass was used for the medium substrate. The magnetoresistive element 23 consisted of NiO (50 nm)/$Co_{90}Fe_{10}$ (3 nm)/Cu (2.5 nm)/$Co_{92}Hf_5Pd_3$/Ta (2 nm) processed to dimensions of 2×1 µm using a PR process.

The head was incorporated into an integrated recording/playback head like that depicted in FIG. 3 and configured as a slider. Data was recorded onto and read out from the medium. The write track width was 1.5 µm, the write gap was 0.2 μm, and the readout track width was 1.0 μm. The coercive force of the medium was 2.5 kOe. The properties observed when the playback output was measured while varying the recording mark length are presented in FIG. 18. The heads were subjected to environmental tests at 80° C., 500 Oe; there was no change in the error rate over the first 1500 hours.

Next, a flux guide type element of the type depicted in FIG. 2 was fabricated using NiMn for the antiferromagnetic layer and $Co_{8.25}Zr_{5.5}Ta_4Nb_8$ for the free magnetic layer. NiFe was used for the bottom shield 21, alumina was used for the nonmagnetic insulating layers 22 and 24, three types of material, NiZn ferrite, MnZn ferrite, and MgZn ferrite, were used for the magnetic insulating layer 25, NiFe was used for the flux guide 26, alumina was used for the nonmagnetic insulating layer 27, CoZrTa was used for the top shield 28, Ta/Au/Ta was used for the electrode 29, CoCrPt was used for the bias layer 30 for stabilizing the magnetic domain of the magnetoresistive element, and NiMn was used for the bias layer 31 for stabilizing the magnetic domain of the flux guide. The recording medium was a CoCrPt/NiFe two-layer medium; glass was used for the medium substrate. The magnetoresistive element 23 consisted of Ta (5 nm)/NiMn (30 nm)/$Co_{90}Fe_{10}$ (3 nm)/Cu (2.5 nm)/$Co_{8.25}Zr_{5.5}Ta_4Nb_8$/Ta (2 nm) processed to dimensions of 2×1 μm using a PR process.

The head was incorporated into an integrated recording/playback head like that depicted in FIG. 3 and configured as a slider. Data was recorded onto and read out from the medium. The write track width was 1.5 μm, the write gap was 0.2 μm, and the readout track width was 1.0 μm. The coercive force of the medium was 2.5 kOe. The properties observed when the playback output was measured while varying the recording mark length are presented in FIG. 19. The heads were subjected to environmental tests at 80° C., 500 Oe; there was no change in the error rate over the first 1500 hours.

Next, a flux guide type element of the type depicted in FIG. 2 was fabricated using FeMn for the antiferromagnetic layer and $Co_{79}Zr_{10}Mo_9Ni_2$ for the free magnetic layer. NiFe was used for the bottom shield 21, alumina was used for the nonmagnetic insulating layers 22 and 24, three types of material, NiZn ferrite, MnZn ferrite, and MgZn ferrite, were used for the magnetic insulating layer 25, NiFe was used for the flux guide 26, alumina was used for the nonmagnetic insulating layer 27, CoZrTa was used for the top shield 28, Ta/Au/Ta was used for the electrode 29, CoCrPt was used for the bias layer 30 for stabilizing the magnetic domain of the magnetoresistive element, and NiMn was used for the bias layer 31 for stabilizing the magnetic domain of the flux guide. The recording medium was a CoCrPt/NiFe two-layer medium; glass was used for the medium substrate. The magnetoresistive element 23 consisted of Ta (5 nm)/$Co_{79}Zr_{10}Mo_9Ni_2$/Cu (2.5 nm)/$Co_{90}Fe_{10}$ (3 nm)/FeMn/Ta (2 nm) processed to dimensions of 2×1 μm using a PR process.

The head was incorporated into an integrated recording/playback head like that depicted in FIG. 3 and configured as a slider. Data was recorded onto and read out from the medium. The write track width was 1.5 μm, the write gap was 0.2 μm, and the readout track width was 1.0 μm. The coercive force of the medium was 2.5 kOe. The properties observed when the playback output was measured while varying the recording mark length are presented in FIG. 20. The heads were subjected to environmental tests at 80° C., 500 Oe; there was no change in the error rate over the first 1500 hours.

Next, a magnetic disk device constructed using the present invention will be described. The magnetic disk device comprised three magnetic disks disposed on a base. A head drive circuit, signal processing circuit, and input/output interface were accommodated at the back side of the base. External connections were provided through a 32-bit busline. Six heads were disposed at the two sides of the magnetic disks. A rotary actuator for driving the head, drive and control circuits therefor, and a spindle direct drive motor for rotating the disks were also provided. The disk diameter was 46 mm; the data surface constituted from 10 mm to 40 mm of the diameter. The use of a recessed servo system made high density possible owing to the absence of the servo face. The device could be connected directly to a small computer for use as a peripheral storage device. For input/output interface, cache memory was provided and a busline with a transfer speed of 5 to 20 megabytes per second was provided. An external controller was also provided so that a plurality of devices could be hooked up to form a high-capacity magnetic disk device.

In accordance with the present invention, the yoke or flux guide for guiding external magnetic fields in a yoke type or flux guide type magnetoresistive head is provided to the magnetoresistive element via an interposed magnetic insulating layer or soft magnetic layer, allowing external magnetic fields to be guided efficiently to the magnetoresistive element. Thus, strong playback output and good frequency characteristics can be achieved while retaining the advantage of high durability afforded by the recessed magnetoresistive element.

The invention may be embodied in other specific forms without departing from the spirit or essential characteristic thereof. The present embodiments is therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese patent application no. 09-046443 (filed on Feb. 28, 1997) including specification, claims, drawings and summary are incorporated herein by reference in its entirety.

What is claimed is:

1. A magnetoresistive head comprising:
    (a) a magnetoresistive element spaced from an ABS (Air Bearing Surface), and comprising a substrate layer, an antiferromagnetic layer, a fixed magnetic layer, a first MR enhancement layer, a nonmagnetic layer, a second MR enhancement layer, and a free magnetic layer; wherein:
        (i) the fixed magnetic layer thereof consists of a simple substance, an alloy, or a laminate film selected from the group consisting of Co, Ni, and Fe; and
        (ii) the first and second MR enhancement layers thereof consist of an amorphous magnetic material or an alloy selected from the group consisting of CoFeB, CoZrMo, CoZrNb, CoZr, CoZrTa, CoHf, CoTa, CoTaHf, CoNbHf, CoZrNb, CoHfpd, CoTaZrNb, and CoZrMoNi; and
    (b) a yoke or flux guide for guiding an external magnetic field to the magnetoresistive element wherein the yoke or flux guide is provided to the magnetoresistive element via an interposed magnetic insulating layer.

2. A magnetoresistive head comprising:
    (a) a magnetoresistive element spaced from an ABS (Air Bearing Surface) and comprising a substrate layer, an antiferromagnetic layer, a fixed magnetic layer, a first MR enhancement layer, a nonmagnetic layer, a second MR enhancement layer, a free magnetic layer; and wherein:
   (i) the fixed magnetic layer thereof consists of a simple substance, an alloy, and a laminate film selected from the group consisting of Co, Ni, and Fe; and
   (ii) the first and second MR enhancement layers thereof consist of an amorphous magnetic material or an alloy selected from the group consisting of CoFeB, CoZrMo, CoZrNb, CoZr, CoZrTa, CoHf, CoTa, CoTaHf, CoNbHf, CoZrNb, CoHfPd, CoTaZrNb, and CoZrMoNi; and
(b) a yoke or flux guide for guiding an external magnetic field to the magnetoresistive element wherein the yoke or flux guide is provided to the magnetoresistive element via an interposed soft magnetic layer.

3. A magnetoresistive head, comprising:
(a) a magnetoresistive element disposed some distance from the ABS (Air bearing surface), and comprising a substrate layer, an antiferromagnetic layer, a fixed magnetic layer, a first MR enhancement layer, a nonmagnetic layer, a second MR enhancement layer, and a free magnetic layer; and wherein
   (i) the fixed magnetic layer thereof consists of a simple substrate, an alloy or a laminate film selected from the group consisting of Co, Ni, and Fe; and
   (ii) the first and second MR enhancement layers thereof each consist of an amorphous magnetic material or an alloy selected from the group consisting of CoFeB, CoZrMo, CoZrNb, CoZr, CoZrTa, CoHf, CoTa, CoTaHf, CoNbHf, CoZrNb, CoHfPd, CoTaZrNb, and CoZrMoNi; and
(b) a yoke or flux guide for guiding an external magnetic field to the magnetoresistive element wherein the yoke or flux guide is provided to the magnetoresistive element via an interposed soft magnetic layer which overlaps the magnetoresistive element, in part.

4. A magnetoresistive head as defined in claim 3, wherein the free magnetic layer thereof is a sandwich film comprising a first fixed magnetic layer, a nonmagnetic layer, and a second fixed magnetic layer.

5. A magnetoresistive head as defined in claim 3, wherein the fixed magnetic layer thereof is a sandwich film comprising a first fixed magnetic layer, a nonmagnetic layer, and a second fixed magnetic layer.

6. A magnetoresistive head, comprising:
(a) a magnetoresistive element spaced from the ABS (Air bearing surface), and comprising a substrate layer, an antiferromagnetic layer, a fixed magnetic layer, a first MR enhancement layer, a nonmagnetic layer, a second MR enhancement layer, and a free magnetic layer; and wherein
   (i) the fixed magnetic layer thereof consists of a simple substance, an alloy or a laminate film selected from the group consisting of Co, Ni, and Fe; and
   (ii) the first and second MR enhancement layers thereof each consist of an amorphous magnetic material or an alloy selected from the group consisting of CoFeB, CoZrMo, CoZrNb, CoZr, CoZrTa, CoHf, CoTa, CoTaHf, CoNbHf, CoZrNb, CoHfPd, CoTaZrNb, and CoZrMoNi, and
(b) a yoke or flux guide for guiding an external magnetic field to the magnetoresistive element wherein the yoke or flux guide is provided to the magnetoresistive element via an interposed magnetic insulating layer which consists of NiZn ferrite, MnZn ferrite, or MgZn ferrite, and which overlaps the magnetoresistive element, in part.

7. A magnetoresistive head as defined in claim 6, wherein the free magnetic layer thereof is a sandwich film comprising a first fixed magnetic layer, a nonmagnetic layer, and a second fixed magnetic layer.

8. A magnetoresistive head as defined in claim 6, wherein the fixed magnetic layer thereof is a sandwich film comprising a first fixed magnetic layer, a nonmagnetic layer, and a second fixed magnetic layer.

9. A magnetoresistive head, comprising:
(a) a magnetoresistive element spaced from the ABS (Air bearing surface); and wherein the magnetoresistive element thereof comprises a substrate layer, an antiferromagnetic layer, a fixed magnetic layer, a nonmagnetic layer, and a free magnetic layer, wherein the free magnetic layer thereof is a sandwich film comprising a first fixed magnetic layer, a nonmagnetic layer, and a second fixed magnetic layer; and wherein
   (i) the fixed magnetic layer thereof consists of a simple substance, an alloy, or a laminate film selected from the group consisting of Co, Ni, and Fe; and
   (ii) the free magnetic layer thereof consists of an amorphous magnetic material or an alloy selected from the group consisting of CoFeB, CoZrMo, CoZrNb, CoZr, CoZrTa, CoHf, CoTa, CoTaHf, CoNbHf, CoZrNb, CoHfPd, CoTaZrNb, and CoZrMoNi; and
(b) a yoke or flux guide for guiding an external magnetic field to the magnetoresistive element wherein the yoke or flux guide is provided to the magnetoresistive element via an interposed magnetic insulating layer which overlaps the magnetoresistive element, in part.

10. A magnetoresistive head, comprising:
(a) a magnetoresistive element disposed some distance from the ABS (Air bearing surface) wherein the magnetoresistive element thereof comprises a substrate layer, an antiferromagnetic layer, a fixed magnetic layer, a nonmagnetic layer, and free a magnetic layer, wherein the free magnetic layer thereof is a sandwich film comprising a first fixed magnetic layer, and a nonmagnetic layer, and a second fixed magnetic layer, and wherein
   (i) the fixed magnetic layer thereof consists of a simple substrate, an alloy, or a laminate film selected from the group consisting of Co, Ni, and Fe; and
   (ii) the free magnetic layer thereof consists of an amorphous magnetic material or an alloy selected from the group consisting of CoFeB, CoZrMo, CoZrNb, CoZr, CoZrTa, CoHf, CoTa, CoTaHf, CoNbHf, CoZrNb, CoHfPd, CoTaZrNb, or CoZrMoNi;
(b) a yoke or flux guide for guiding an external magnetic field to the magnetoresistive element wherein the yoke or flux guide is provided to the magnetoresistive element via an interposed soft magnetic layer which overlaps the magnetoresistive element, in part.

11. A magnetoresistive head, comprising:
(a) a magnetoresistive element spaced from the ABS (Air bearing surface), wherein the magnetoresistive element thereof comprises a substrate layer, an antiferromagnetic layer, a fixed magnetic layer, a nonmagnetic layer, and a free magnetic layer, wherein the free magnetic layer thereof is a sandwich film comprising a first fixed magnetic layer, a nonmagnetic layer, and a second fixed magnetic layer; and wherein
   (i) the fixed magnetic layer thereof consists of a simple substance, an alloy or a laminate film selected from the group consisting of Co, Ni, and Fe; and (ii) the free magnetic layer thereof consists of an amorphous magnetic material or an alloy selected from the group consisting of CoFeB, CoZrMo, CoZrNb, CoZr, CoZrTa, CoHf, CoTa, CoTaHf, CoNbHf, CoZrNb, CoHfPd, CoTaZrNb, and CoZrMoNi; and (b) a yoke or flux guide for guiding an external magnetic field to the magnetoresistive element wherein the yoke or flux guide is provided to the magnetoresistive element via an interposed magnetic insulating layer which consists of NiZn ferrite, MnZn ferrite, or MgZn ferrite, and which overlaps the magnetoresistive element, in part.

12. A magnetoresistive head, comprising:

(a) a magnetoresistive element spaced from the ABS (Air bearing surface), wherein the magnetoresistive element thereof comprises a substrate layer, an antiferromagnetic layer, a fixed magnetic layer, a first MR enhancement layer, a nonmagnetic layer, a second MR enhancement layer, and a free magnetic layer, wherein the free magnetic layer thereof is a sandwich film comprising a first fixed magnetic layer, a nonmagnetic layer, and a second fixed magnetic layer; and wherein (i) the fixed magnetic layer thereof consists of a simple substance, an alloy or a laminate film selected from the group consisting of Co, Ni, and Fe; and (ii) the first and second MR enhancement layers thereof each consist of an amorphous magnetic material or an alloy selected from the group consisting of CoFeB, CoZrMo, CoZrNb, CoZr, CoZrTa, CoHf, CoTa, CoTaHf, CoNbHb, CoZrNb, CoHfPd, CoTaZrNb, and CoZrMoNi; and (b) a yoke or flux guide for guiding an external magnetic field to the magnetoresistive element wherein the yoke or flux guide is provided to the magnetoresistive element via an interposed magnetic insulating layer which overlaps the magnetoresistive element, in part.

13. A magnetoresistive head, comprising:

(a) a magnetoresistive element spaced from the ABS (Air bearing surface), wherein the magnetoresistive element thereof comprises a substrate layer, an antiferromagnetic layer, a fixed magnetic layer, a nonmagnetic layer, and a free magnetic layer, wherein the fixed magnetic layer thereof is a sandwich film comprising a first fixed magnetic layer, a nonmagnetic layer, and a second fixed magnetic layer; and wherein (i) the fixed magnetic layer thereof consists of a simple substance, an alloy, or a laminate film selected from the group consisting of Co, Ni, and Fe; and (ii) the free magnetic layer thereof consists of an amorphous magnetic material or an alloy selected from the group consisting of CoFeB, CoZrMo, CoZrNb, CoZr, CoZrTa, CoHf, CoTa, CoTaHf, CoNbHf, CoZrNb, CoHfPd, CoTaZrNb, and CoZrMoNi; and (b) a yoke or flux guide for guiding an external magnetic field to the magnetoresistive element wherein the yoke or flux guide is provided to the magnetoresistive element via an interposed magnetic insulating layer which overlaps the magnetoresistive element, in part.

14. A magnetoresistive head, comprising:

(a) a magnetoresistive element disposed some distance from the ABS (Air bearing surface), wherein the magnetoresistive element thereof, comprises a substrate layer, an antiferromagnetic layer, a fixed magnetic layer, a nonmagnetic layer, and a free magnetic layer, wherein the fixed magnetic layer thereof is a sandwich film comprising a first fixed magnetic layer, a nonmagnetic layer, and a second fixed magnetic layer; and wherein (i) the fixed magnetic layer thereof consists of a simple substrate, an alloy, or a laminate film selected from the group consisting of Co, Ni, and Fe; and (ii) the free magnetic layer thereof consists of an amorphous magnetic material or an alloy selected from the group consisting of CoFeB, CoZrMo, CoZrNb, CoZr, CoZrTa, CoHf, CoTa, CoTaHf, CoNbHf, CoZrNb, CoHfPd, CoTaZrNb, or CoZrMoNi, and (b) a yoke or flux guide for guiding an external magnetic field to the magnetoresistive element wherein the yoke or flux guide is provided to the magnetoresistive element via an interposed soft magnetic layer which overlaps the magnetoresistive element, in part.

15. A magnetoresistive head, comprising:

(a) a magnetoresistive element spaced from the ABS (Air bearing surface), wherein the magnetoresistive element thereof comprises a substrate layer, an antiferromagnetic layer, a fixed magnetic layer, a nonmagnetic layer, and a free magnetic layer, wherein the fixed magnetic layer thereof is a sandwich film comprising a first fixed magnetic layer, a nonmagnetic layer, and a second fixed magnetic layer; and wherein (i) the fixed magnetic layer thereof consists of a simple substance, an alloy or a laminate film selected from the group consisting of Co, Ni, and Fe; and (ii) the free magnetic layer thereof consists of an amorphous magnetic material or an alloy selected from the group consisting of CoFeB, CoZrMo, CoZrNb, CoZr, CoZrTa, CoHf, CoTa, CoTaHf, CoNbHf, CoZrNb, CoHfPd, CoTaZrNb,, and CoZrMoNi; and (b) a yoke or fixed guide for guiding an external magnetic field to the magnetoresistive element wherein the yoke or flux guide is provided to the magnetoresistive element via an interposed magnetic insulating layer which consists of NiZn ferrite, MnZn ferrite or MgZn ferrite, and which overlaps the magnetoresistive element, in part.

16. A magnetoresistive head, comprising:

(a) a magnetoresistive element spaced from the ABS (Air bearing surface), wherein the magnetoresistive element thereof comprises a substrate layer, an antiferromagnetic layer, a fixed magnetic layer, a first MR enhancement layer, a nonmagnetic layer, a second MR enhancement layer, and a free magnetic layer, and wherein (i) the fixed magnetic layer thereof consists of a simple substance, an alloy or a laminate film selected from the group consisting of Co, Ni, and Fe; and (ii) the first and second MR enhancement layers thereof each consist of an amorphous magnetic material or an alloy selected from the group consisting of CoFeB, CoZrMo, CoZrNb, CoZr, CoZrTa, CoHf, CoTa, CoTaHf, CoNbHf, CoZrNb, CoHfPd, CoTaZrNb, and CoZrMoNi; and (b) a yoke or flux guide for guiding an external magnetic field to the magnetoresistive element wherein the yoke or flux guide is provided to the magnetoresistive element via an interposed magnetic insulating layer which overlaps the magnetoresistive element, in part.

* * * * *

UNITED STATES PATENT AND TRADEMARK OFFICE
CERTIFICATE OF CORRECTION

PATENT NO. : 6,101,072
DATED : August 8, 2000
INVENTOR(S) : Kazuhiko Hayashi

It is certified that error appears in the above-identified patent and that said Letters Patent is hereby corrected as shown below:

Column 14, claim 1,
Line 58, change "CoHfpd" to -- CoHfPd --.

Signed and Sealed this

Nineteenth Day of February, 2002

*Attest:*

JAMES E. ROGAN
*Attesting Officer*   *Director of the United States Patent and Trademark Office*